United States Patent
Rice et al.

(10) Patent No.: US 6,950,272 B1
(45) Date of Patent: Sep. 27, 2005

(54) METHOD AND APPARATUS FOR THE ACOUSTIC IMPROVEMENT OF THE PULSED CURRENT METHOD FOR CONTROLLING THE VELOCITY OF A TRANSDUCER HEAD

(75) Inventors: Mark Rice, San Jose, CA (US);
Bernhard Hiller, San Jose, CA (US);
Richard Yaeger, Sunnyvale, CA (US)

(73) Assignee: Maxtor Corporation, Longmont, CO (US)

( * ) Notice: Subject to any disclaimer, the term of this patent is extended or adjusted under 35 U.S.C. 154(b) by 63 days.

(21) Appl. No.: 09/712,878

(22) Filed: Nov. 14, 2000

Related U.S. Application Data (60) Provisional application No. 60/211,332, filed on Jun. 9, 2000.

(51) Int. Cl.[7] ............................................. G11B 5/596
(52) U.S. Cl. ..................................... 360/78.06; 360/75
(58) Field of Search .............................. 360/75, 78.04, 360/78.06; 318/254–256, 560

(56) References Cited

U.S. PATENT DOCUMENTS

| | | | |
|---|---|---|---|
| 4,864,437 A | 9/1989 | Couse et al. .................. 360/75 |
| 5,027,241 A | 6/1991 | Hatch et al. .................. 360/105 |
| 5,615,064 A | 3/1997 | Blank et al. .................. 360/75 |
| 5,663,846 A | 9/1997 | Masuoka et al. .............. 360/75 |
| 5,781,363 A * | 7/1998 | Rowan et al. ........... 360/78.09 |
| 5,936,788 A * | 8/1999 | Boutaghou et al. ............ 360/75 |
| 6,282,049 B1 * | 8/2001 | Cameron et al. .............. 360/75 |
| 6,316,898 B1 * | 11/2001 | Albrecht et al. ............ 318/560 |
| 6,690,536 B1 * | 2/2004 | Ryan ....................... 360/78.04 |

\* cited by examiner

*Primary Examiner*—David Hudspeth
*Assistant Examiner*—K. Wong
(74) *Attorney, Agent, or Firm*—Tejpal S. Hansra (57) ABSTRACT

A method and apparatus for reducing the acoustic output of a computer disk drive during a load or unload operation are provided. According to the invention, a pulse train having pulse widths that vary from one pulse to the next is provided to a voice coil motor while the transducer head is being loaded or unloaded from the surface of the disk. According to one embodiment of the present invention, a proportional term equal to the inverse of the pulse width is supplied to the controller such that, with all other inputs to the controller being equal, a pulse train having pulses of equal total power are produced. By providing pulses of varying widths, the acoustic output of the disk drive is spread among multiple frequencies, and the amplitude at any one frequency is diminished as compared to a pulse train having pulses of equal width.

56 Claims, 6 Drawing Sheets

*Prior Art*

METHOD AND APPARATUS FOR THE ACOUSTIC IMPROVEMENT OF THE PULSED CURRENT METHOD FOR CONTROLLING THE VELOCITY OF A TRANSDUCER HEAD

CROSS REFERENCE TO RELATED APPLICATIONS

Priority is claimed from U.S. Provisional Patent Application No. 60/211,332, filed Jun. 9, 2000 entitled "Acoustic Improvement for the Pulsed Current Method of Actuator Velocity Control Based on Sampling VCM BEMF", which is incorporated herein by reference in its entirety.

FIELD OF THE INVENTION

The present invention relates to controlling the movement of an actuator arm in a computer disk drive. In particular, the present invention relates to improving the acoustic characteristics of a hard disk drive during loading and unloading of the actuator arm.

BACKGROUND OF THE INVENTION

Figure 1:
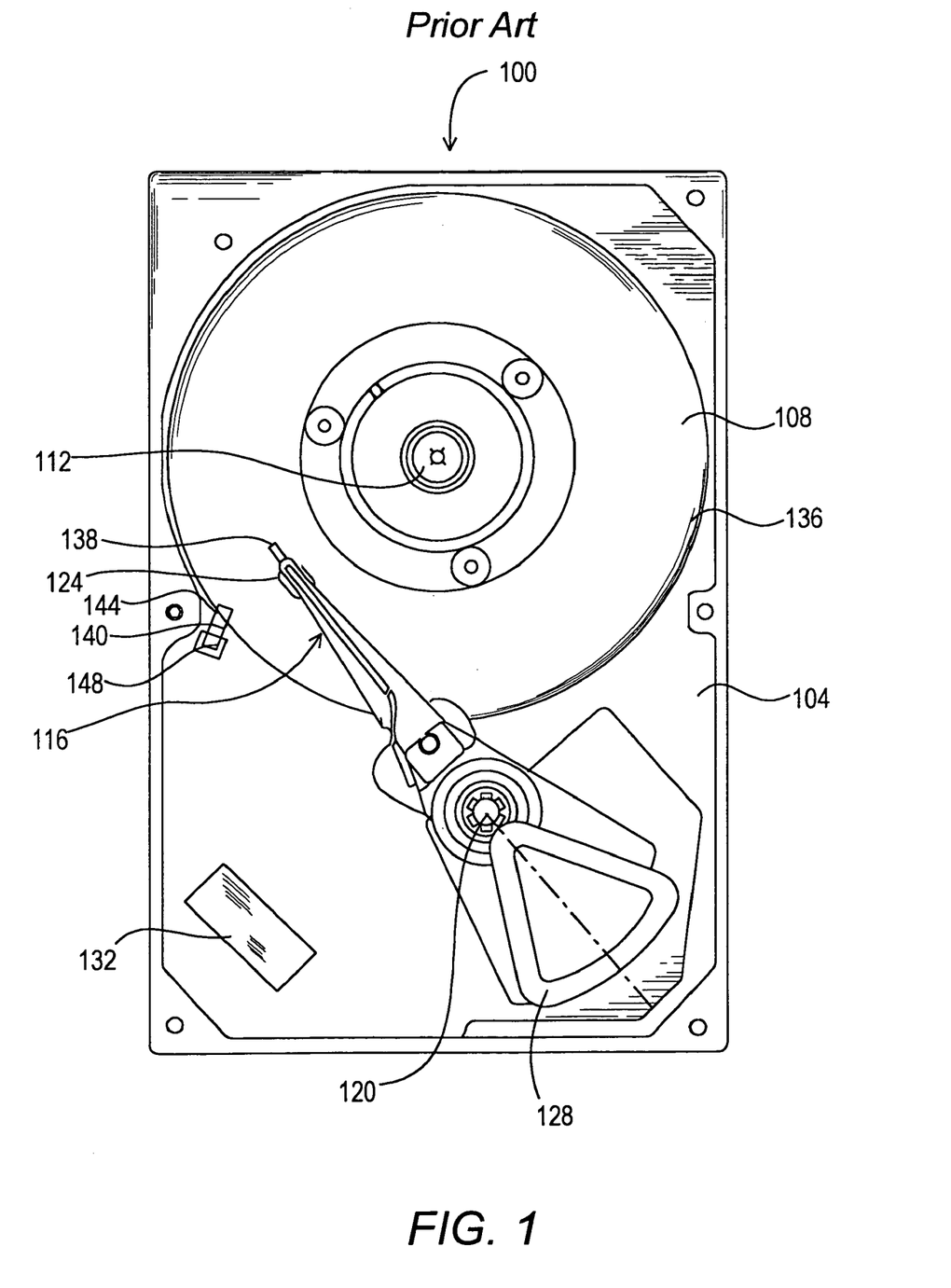
FIG. 1 is a diagrammatic representation of a top view of a conventional computer disk drive, with the cover removed.

Computer disk drives store information on magnetic disks in concentric tracks. A typical computer disk drive is illustrated in FIG. 1. The disk drive, generally identified by reference numeral 100, includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104. Actuator arm assemblies 116 (only one of which is shown in FIG. 1) are interconnected to the base 104 by a bearing 120, such that the actuator arm assemblies 116 can be moved radially with respect to the magnetic disks 108. The actuator arm assemblies 116 each include a transducer head 124 at a first end, to address each of the surfaces of the magnetic disks 108. A voice coil motor 128 pivots the actuator arm assemblies 116 about the bearing 120, to radially position the transducer heads 124 across the surfaces of the magnetic disks 108. The voice coil motor 128 is operated by a controller 132 that is in turn operatively connected to a host computer (not shown). By changing the radial position of the transducer heads 124 with respect to the magnetic disks 108, the transducer heads 124 can access different tracks or cylinders 136 on the magnetic disks 108.

The high rotational speed of the magnetic disks 108 when the disk drive 100 is in use creates a boundary layer of air that rotates with the surface of each disk 108. This boundary layer is sufficient to suspend the transducer heads 124 above the surfaces of the disks 108 at a predetermined flying height. As the storage capacities of hard disk drives have increased, the flying height of the transducer heads 124 has become increasingly small. A low flying height assists in increasing the storage density of a drive 100 by allowing the magnetic transitions that store information on the disks 108 to be more tightly grouped. However, a low flying height requires a smooth disk surface, which results in increased friction between the transducer heads 124 and the surfaces of the disks 108 when the disks 108 are not rotating, thereby making it more difficult to bring the disks 108 to a rotational speed at which the heads 124 can fly. In certain instances, a "stiction event" can occur, in which the torque of the spindle motor is insufficient to break the adhesion between the transducer heads 124 and the surfaces of the disks 108. In order to overcome these problems, disk drives have been provided with special "landing zones" having a textured surface and designed for receiving the transducer heads 124 when the disks 108 are not rotating. However, these textured areas can cause oscillations in low flying heads 124. In addition, the provision of landing zones does not prevent actuator arms 116 from moving and coming into contact with the disks 108, for instance in response to shocks, and damaging the surfaces of the disks 108.

In order to overcome these problems, disk drive actuator arm assemblies 116 may be provided with tabs or cam followers 138 capable of engaging corresponding cams 140 when the actuator arm assemblies 116 are in a parked position. The cams 140 each generally contain a ramp portion 144 and a detent portion 148. When the disk drive 100 is not in use, the actuator arm assemblies 116 are generally positioned such that the tabs 138 are held in the cams 140 at the detents 148. The transducer heads 124 are said to be "unloaded" from the disks 108 when the tabs 138 are held by the cams 140. The terms "load" and "unload" can be interchanged, but for purposes of the present invention, "unloading" refers to removing a transducer head 124 from the disk 108 surface and "loading" refers to placing a transducer head 124 adjacent the disk 108 surface such that read and write operations may be carried out. When the transducer heads 124 are in the unloaded position, the magnetic disks 108 are protected from damage that may be caused by a collision between a transducer head 124 and the disk 108, because the actuator arms 116 are held in place by the cams 140.

Before data can be read from or written to the disks 108, the transducer heads 124 must be "loaded" onto the surfaces of the magnetic disks 108. In loading the transducer heads 124, it is important to ensure that the transducer heads 124 are not traveling at too great a velocity. If the transducer heads 124 leave the cam 140 at too great a velocity, the component of their motion that is perpendicular to the surfaces of the disks 108 will likely be too great for the boundary layer of air to support the transducer heads 124 and prevent contact between the transducer heads 124 and the disks 108. Such contact will likely cause a loss of data from the disk drive 100. Conversely, it is important to load the transducer heads 124 as quickly as possible, in order to limit the time period during which the host computer must wait before information can be retrieved from the disk drive 100. Accordingly, it is desirable to closely regulate the velocity of the transducer heads 124 during loading. During unloading, high speed is also desirable. However, the transducer heads should not be unloaded at too great a speed, to avoid damaging the actuator arm assemblies when they contact the cams 140. Also, if the head travels at too great a speed, it can bounce and strike the disk. In addition, cam wear is higher if the head travels at too great a velocity.

While the transducer heads 124 are being loaded, the transducer heads 124 are lifted away from the surfaces of the disks 108 by the cam 140. Accordingly, information encoded on the disks 108 concerning the position of the transducer heads 124 with respect to the surfaces of the disks 108 is not available, and the velocity of a transducer head 124 cannot be determined by reading information from the disks 108. However, the movement of the coils of the voice coil motor 128 with respect to the magnets of the voice coil motor 128 produces a back electromagnetic force (BEMF; or back EMF) in the coil of the voice coil motor 128. Because this back EMF is proportional to the velocity of the actuator arm assemblies 116, it can be sensed and used to determine the velocity of the transducer heads 124.

The back EMF generated by the movement of the voice coil motor 128 can be determined if the resistance and inductance of the voice coil motor 128 are known. In particular, the back EMF generated by the movement of the voice coil motor 128 is equal to the voltage supplied to the voice coil motor less the voltage drop due to the internal resistance and inductance of the voice coil motor. However, this method is unreliable, as the resistance of the voice coil motor 128 changes while the voice coil motor 128 is in motion.

Figure 2:
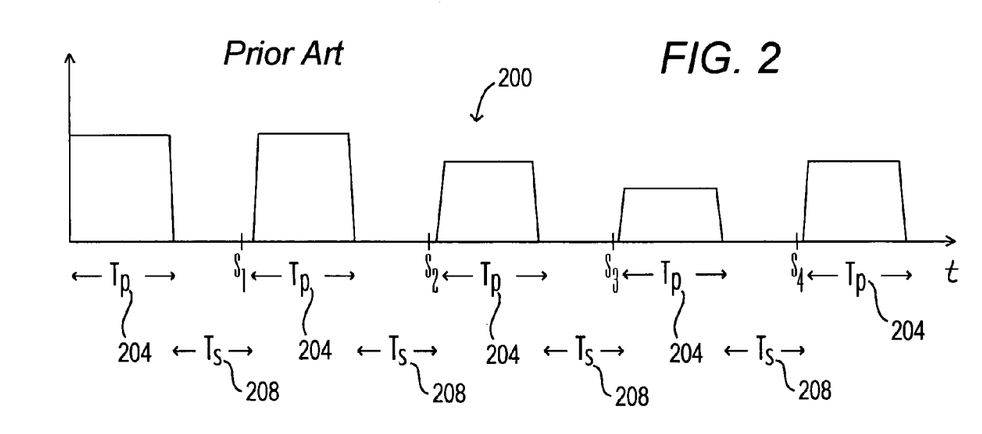
FIG. 2 is a diagrammatic representation of a pulse train having pulses produced at regular intervals according to the prior art.

Another approach to reading the back EMF generated in a voice coil motor 128 has been to turn off the drive current to the voice coil motor 128 at regular intervals of time. The back EMF is then sampled while the drive current is off. One such prior art approach is depicted in FIG. 2. In FIG. 2, a train of pulses 200 having regular pulse widths $T_p$ 204 and varying current or voltage levels are shown. In between the pulses 200 are regular sampling intervals $T_S$ 208. During the sampling intervals, samples of the back EMF $S_1$, $S_2$, $S_3$, $S_4$ and $S_5$ are taken. According to this approach, the width $T_p$ 204 of the pulses is constant, and the amplitude of the pulses 200 is varied in order to adjust the velocity of the transducer heads 124. The provision of electrical power to the voice coil motor 128 is discontinued during the sampling times $T_S$ 208 in order to allow an accurate reading of the back EMF to be taken. However, this approach results in the production of a relatively loud and objectionable audible noise due to the regular frequency with which power is applied to the voice coil motor 128.

Figure 3:
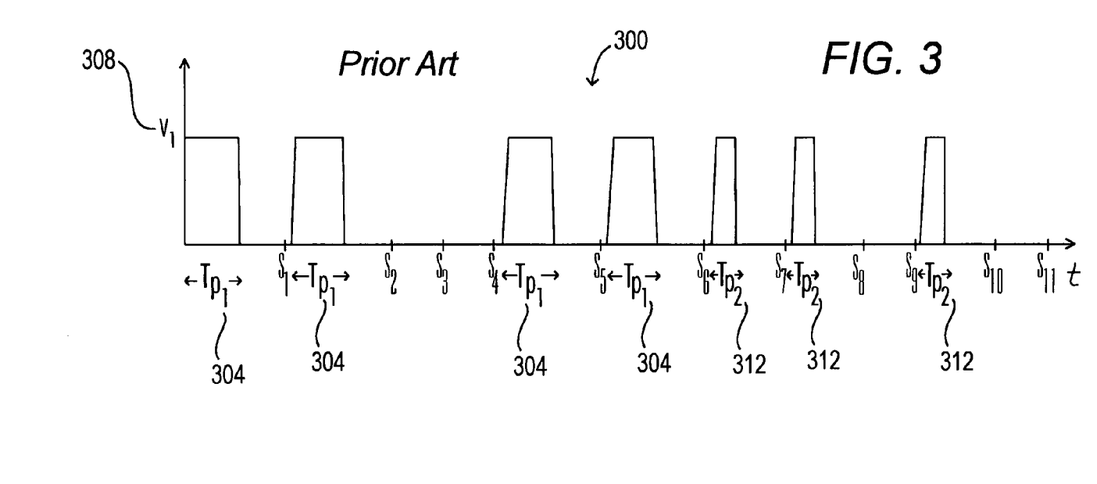
FIG. 3 is a diagrammatic representation of a pulse train that provides pulses according to the velocity of the transducer head according to the prior art.

Another approach to controlling the velocity with which transducer heads 124 are loaded onto the surface of disks 108 is depicted in FIG. 3. According to this approach, pulses 300 having a first pulse width $T_{p1}$ 304 and amplitude $V_1$ 308 are applied to the voice coil motor 128 in order to maintain a desired velocity of the transducer heads 124 with respect to the surfaces of the disks 108. Where the velocity of the transducer heads 124 is too great, the pulses 300 are discontinued. After a predetermined number of pulses 300 having a first width $T_{p1}$ 304 have been provided to the voice coil motor 128, pulses 300 having a narrower width $T_{p2}$ 312 are applied to the voice coil motor 128. As with the wider pulses 300, the pulses having a narrower width $T_{p2}$ 312 are not provided if the velocity of the transducer heads 124 is found to be too high. Samples of the back EMF are taken at times $S_1$ to $S_9$, when no power is provided to the voice coil motor 128. Accordingly, where the velocity of the transducer heads 124 is at or below a desired velocity, a train of pulses having a regular frequency is produced, thereby creating undesired acoustical noise. In addition, although the provision of pulses may be interrupted where the velocity of the transducer heads 124 is higher than a desired velocity, it is the velocity of the transducer heads 124 which determines whether the pulse train is interrupted or not. Accordingly, this approach does not reliably decrease acoustical noise produced during the loading and unloading of the transducer heads 124.

It would be desirable to provide a method and apparatus for loading and unloading transducer heads 124 from the surfaces of magnetic disks 108 in such a way that an objectionable acoustical output is not produced. In addition, it would be desirable to provide such a method and apparatus that allows accurate control of the velocity with which transducer heads 124 are loaded and unloaded from disk 108 surfaces. Furthermore, it would be desirable to provide such a method and apparatus that is inexpensive to implement and reliable in operation.

SUMMARY OF THE INVENTION

In accordance with the present invention, a method and apparatus for reducing the acoustic noise output of a computer disk drive when loading or unloading transducer heads is provided. The present invention generally provides pulses of electrical power to the voice coil motor used to load and unload the transducer heads that vary in time from one pulse to the next. By providing pulses of electrical power that vary in time, the spectrum of the acoustical output of the disk drive is spread among a plurality of frequencies, thereby reducing the noise output of the disk drive.

In accordance with one embodiment of the present invention, a method and apparatus is provided in which the period of time during which electrical power is supplied to the voice coil motor is determined by reference to a table. In particular, a counter that is incremented with each pulse is used as an index to values stored in a table. Preferably, each succeeding table value differs from its predecessor, producing a noise spectrum that is distributed among a plurality of frequencies. Each of the time values stored in the table may be associated with proportioning values for use in connection with determining the output provided to the voice coil motor during each period. For instance, the associated proportioning values may be the inverse of the time value, ensuring that, when the transducer head is at a desired velocity, the total amount of power provided to the voice coil motor is the same regardless of pulse length.

Between each period during which power is supplied to the voice coil motor, a sampling interval is interposed. Toward the end of the sampling period, after the effects of the power supplied to the voice coil motor during the preceding power pulse have dissipated, a sample of the back electromotive force (BEMF or back EMF) is taken. The back EMF is measured as a voltage, and is proportional to the speed of the transducer head. Accordingly, the monitored back EMF is compared to a target voltage that corresponds to a target velocity.

In general, if the transducer head is not at the desired velocity, the voltage measured as the back EMF will not be equal to the target or desired voltage. Any discrepancy between the voltage measured as the back EMF and the desired voltage may be applied to the determination of the quantity of electrical power to be supplied during the succeeding pulse. In addition to a proportional control term, the controller that supplies electrical power to the voice coil motor may include an integral term to account for the accumulated velocity error of the transducer head in determining the quantity of electrical power to be supplied to the voice coil motor during the next pulse. Furthermore, the controller may include a derivative control term.

According to another embodiment of the present invention, the time of each pulse of electrical power to the voice coil motor is determined randomly or pseudo-randomly. For instance, the period of time may be determined by a random or pseudo-random number generator. Preferably, the pulse widths resulting from the use of random or pseudo-random number generators are bounded by upper and lower time limits. The inverse of the "on" time or pulse width resulting from the use of a random or pseudo-random generator may be applied as a proportional term to the controller algorithm used to determine the total electrical or power output to the voice coil motor.

According to yet another embodiment of the present invention, the time periods during which power is supplied to the voice coil motor progress through a series of predetermined pulse widths. According to this embodiment of the present invention, the pulse times or widths may gradually increase as the controller progresses through the series, the pulse times may decrease as the controller progresses through the series, or each succeeding pulse time may simply be different from the preceding pulse time. The inverse of the pulse time may be provided to the controller as a proportional term.

Based on the foregoing summary, a number of salient features of the present invention are readily discerned. A method and apparatus for reducing the undesired acoustical output of a disk drive when loading and unloading an actuator arm are provided. The method and apparatus of the present invention enable the times during which power is supplied to the disk drive to be varied, without regard to whether a monitored velocity of the transducer head is to be maintained or not. Therefore, a disk drive in accordance with the present invention ensures that the pulse width of a succeeding pulse differs from a preceding pulse, thereby spreading the acoustical energy over a wider range of frequencies. This, in turn, reduces the objectionable audible output from a disk drive during loading or unloading of the actuator arm assemblies.

Additional advantages of the present invention will become readily apparent from the following discussion, particularly when taken together with the accompanying drawings.

DETAILED DESCRIPTION

Figure 4A:
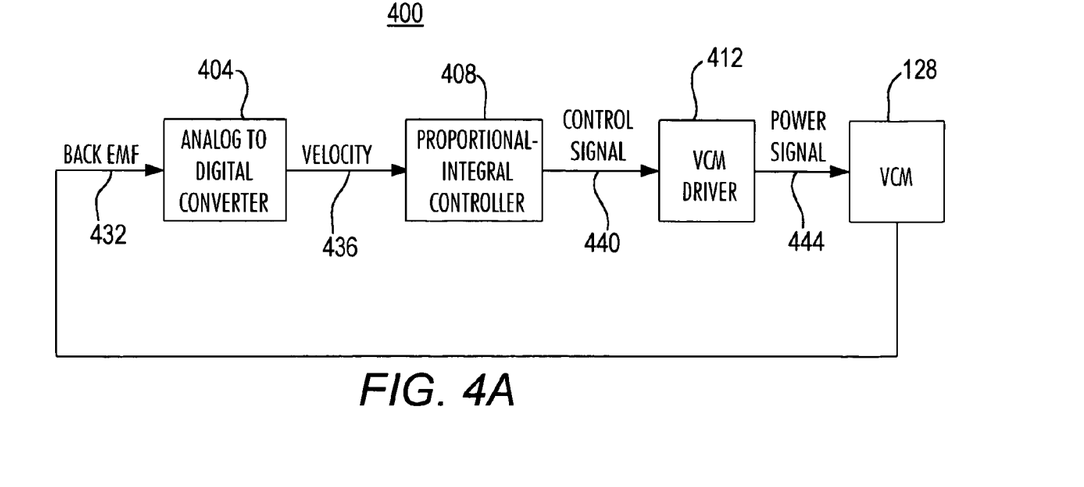
FIG. 4A is a diagrammatic representation of components of a voice coil motor control circuit in accordance with an embodiment of the present invention.
Figure 4B:
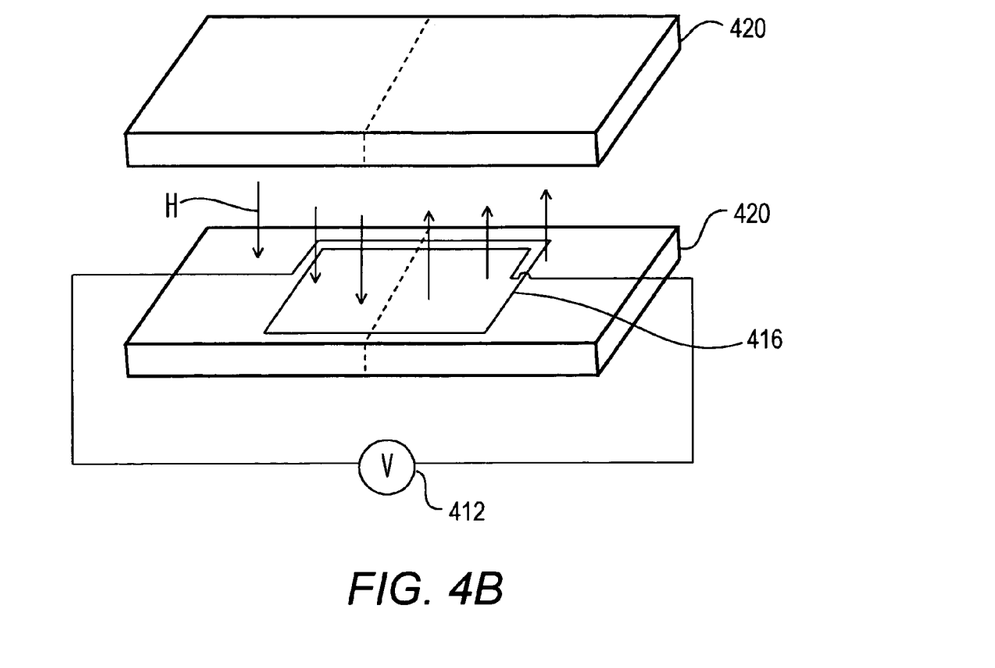
FIG. 4B is a diagrammatic representation of certain components of a voice coil motor.

FIG. 4A is a diagrammatic representation of components of a voice coil motor control circuit 400 in accordance with an embodiment of the present invention. The control circuit 400 generally includes an analog to digital converter 404, a proportional-integral (PI) controller 408, a voice coil motor driver 412 and the voice coil motor (VCM) 128. In general, the analog to digital converter 404, the proportional-integral controller 408 and the voice coil motor driver 412 may be provided as part of the controller 132. The voice coil motor 128 includes a coil 416 (FIG. 4B) that is interconnected to an electrical power source (for instance the VCM driver 412) and that can move through a magnetic field H produced by magnets 420.

During a loading or unloading operation, the actuator arm assemblies 116 are moved by the voice coil motor 128 to position the transducer heads 124 above the surfaces of the disks 108. The corresponding movement of the coil 416 of the voice coil motor 128 through the magnetic field H within the voice coil motor 128 produces a back electromotive force (BEMF or back EMF) in the coil of the voice coil motor 128. According to one embodiment of the present invention, this back EMF, identified in FIG. 4A as signal 432, is provided to the analog to digital converter 404. As will be explained more fully below, the back EMF 432 is sampled by the analog to digital converter 404 while no power is being supplied to the coil 416 of the voice coil motor 128, to increase the accuracy with which the back EMF 432 can be measured. The analog to digital converter 404 generally compares the value of the back EMF 432, which is a measured voltage, to a reference voltage. In general, because the back EMF 432 produced in the coil 416 of the voice coil motor 128 is proportional to the speed of the coil 416 through the magnetic field H of the voice coil motor 128, the back EMF voltage can be correlated to a radial velocity of the transducer heads 124 across the disks 108. Therefore, a reference voltage corresponding to a desired transducer head 124 velocity can be established. In general, the analog to digital converter 404 outputs a voltage signal 436 to the proportional-integral controller 408 that represents the velocity of the transducer heads 124.

The proportional-integral controller 408 receives the velocity signal 436 and calculates a velocity error. The velocity error is equal to the difference between the voltage signal 436 and the reference voltage. In general, the velocity error is applied to the proportional-integral controller 408 control algorithm to determine the amount of power to be provided to the voice coil motor 128 during the next pulse. Although the use of a proportional-integral type control algorithm is preferred, it is not necessary. For instance, as will be appreciated by those of ordinary skill in the art, a proportional, proportional-derivative, proportional-integral-derivative, or any other control algorithm suitable for velocity control may be used.

The control signal 440 from the proportional-integral controller 408 is provided to the VCM driver 412. The VCM driver 412 converts the control signal 440 to a power signal 444 that may be used to power the voice coil motor 128. In particular, the VCM driver 412 may, where the control signal 440 is analog, comprise an amplifier. According to another embodiment of the present invention, the VCM driver 412 may comprise a digital to analog converter in combination with an amplifier. The power signal 444 produced by the VCM driver 412 is sent to the coil 416 of the voice coil motor 128 to move the coil 416 with respect to the magnets 420 and to in turn move the actuator arm assemblies 116.

Figure 5:
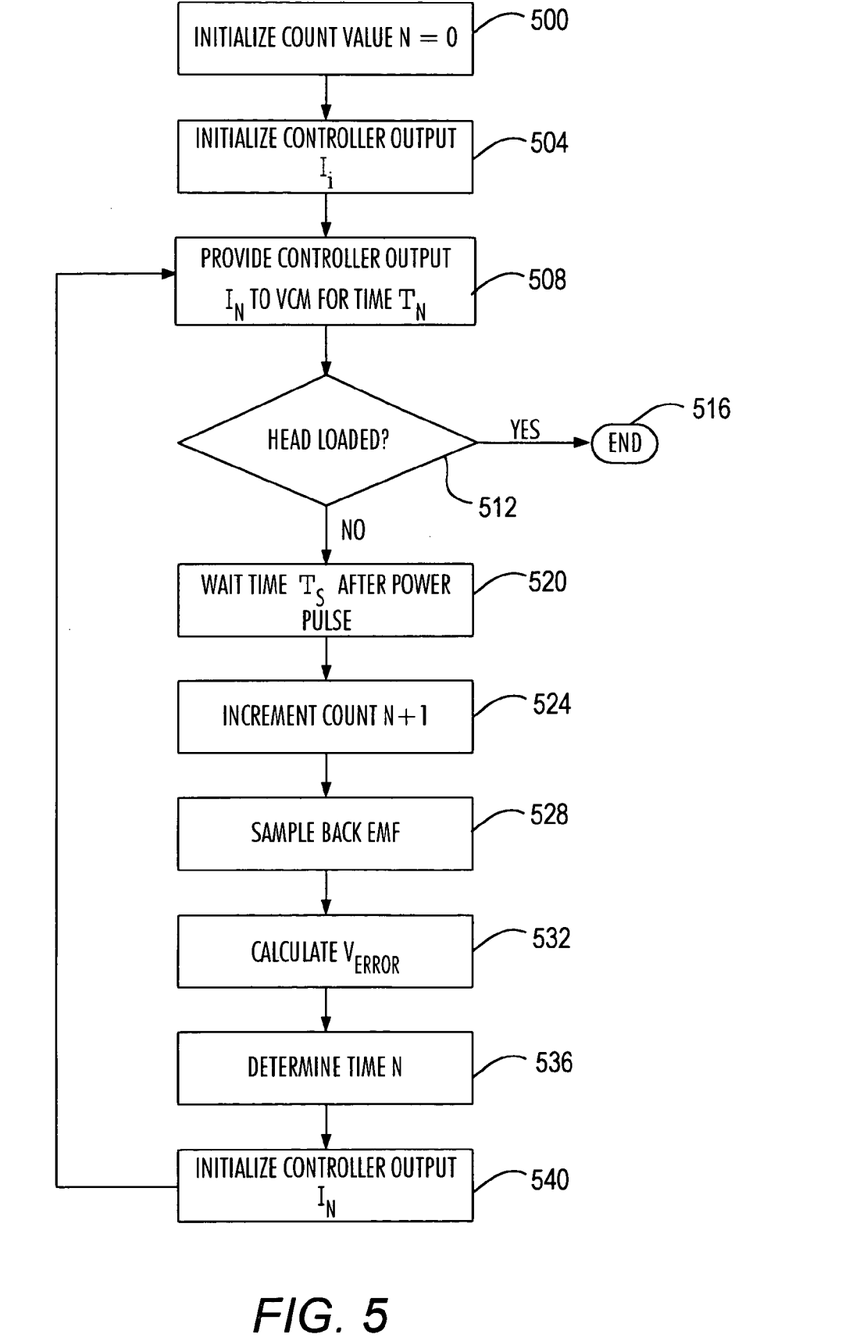
FIG. 5 is a flowchart illustrating the operation of an embodiment of the present invention.

With reference now to FIG. 5, the operation of an embodiment of the present invention is illustrated. Initially, at step 500 a count value N is initialized. According to one embodiment of the present invention, the initial value held by the counter is 0. At step 504, the output of the proportional-integral controller 408 is set to an initial value $I_i$ and is provided as a control signal 440 to the VCM driver 412. At step 508, the control signal 440 is amplified or converted to an analog signal and amplified by the VCM driver 412 and provided to the voice coil motor 128 as power signal 444. As will be appreciated by those of ordinary skill in the art, the VCM driver 412 may be considered as either a voltage source or a current source. According to the present example, the duration or pulse width $T_n$ of the initial output $I_i$ may be determined by reference to a table as will be explained in detail below.

At step 512, a check is made to determine whether the transducer head 124 has been loaded onto the disk 108 surface. This may be accomplished by determining whether valid position information is being read by the transducer head 124 from the disk 108. If such signals are received, the transducer head 124 is loaded and the loading procedure ends (step 516).

If it is determined that the transducer head 124 has not been loaded onto the disk 108, the system delays for a sampling time period $T_S$ after the previous power pulse has ended (step 520). During the sampling period $T_S$ the count N is incremented to the value N+1 (step 524). At step 528, during the sampling period $T_S$, the back EMF is sampled. The velocity error may then be calculated (step 532).

At step 536 the pulse duration or pulse width $T_N$ corresponding to the count value N is determined. The time periods of the pulse duration or pulse width may be specified as absolute or relative times, or as a number of counts by a clock provided as part of the controller 132. According to one embodiment of the present invention, the time $T_N$ during which power is supplied to the voice coil motor is determined by using a counter as an index to a table of time periods. For instance, the least significant digit or a number of least significant digits of a counter may be referenced to a table of time values. For example, with reference now to Table 1, a value of N=0 corresponds to a time value of 5. As shown in Table 1, the time values are different for different values of N. Table 1 illustrates a table containing four different time values or pulse widths. Accordingly, the table values may be conveniently accessed by use of a two bit counter, or by reference to the two least significant bits of a counter having more than two bits, to determine the value N and thus serve as an index to the time values in the table. Of course, greater or lesser numbers of time values may be used.

TABLE 1

| N | 0 | 1 | 2 | 3 |
|---|---|---|---|---|
| $T_N$ | 5 | 4 | 3 | 2 |
| $Kp_N$ | 1/5 | 1/4 | 1/3 | 1/2 |

According to another embodiment of the present invention, the pulse width $T_N$ is determined randomly. Preferably, the randomly determined time period is constrained within lower and upper time bounds. According to this embodiment of the present invention, the time may be determined by a random or pseudo-random number generator.

According to still another embodiment of the present invention, the time $T_N$ may be determined by rotating through a predetermined sequence of times. For instance, at time N=0, the pulse width $T_0$ may be equal to 2, at N=1 the pulse width $T_1$ may be equal to 4, $T_2$ may be equal to 8 and $T_3$ may be equal to 16. At N=4, the pulse width $T_4$ may again be equal to 2 and the time values may progress back through the sequence. Of course, any desired sequence of numbers may be used. In addition, although the described embodiments feature pulses that vary from one pulse to the next, this is not strictly necessary. For example, a relatively short train (e.g., three or four pulses) of pulses having a first pulse width may be followed by another relatively short train of pulses having a second pulse width.

At step 540 the output $I_N$ to the voice coil motor 128 is calculated. $I_N$ may be calculated as a current or a voltage. According to one embodiment of the present invention, the calculation of $I_N$ is performed in the proportional-integral controller 408 of the controller 132, and the appropriate control signal 440 is provided to the VCM driver 412. In general, the proportional term and any other terms of the control algorithm may be multiplied by a value $Kp_N$ equal to the inverse of the pulse width $T_N$ during which the output $I_N$ is supplied to the voice coil motor (i.e., the pulse width of $I_N$). The VCM driver 412 then provides a power signal 444 equal to the output $I_N$ calculated at step 508. Because of the multiplication of some or all of the terms of the control algorithm by the inverse of the pulse width $T_N$ (i.e. by $Kp_N$), the control signal 440 may be proportioned such that, with all other factors being equal, the same total amount of power is supplied to the voice coil motor 128 during each pulse, even though the width $T_N$ of each pulse varies. Accordingly, when the transducer head 124 is at the desired velocity, each pulse contains the same amount of power.

Figure 6:
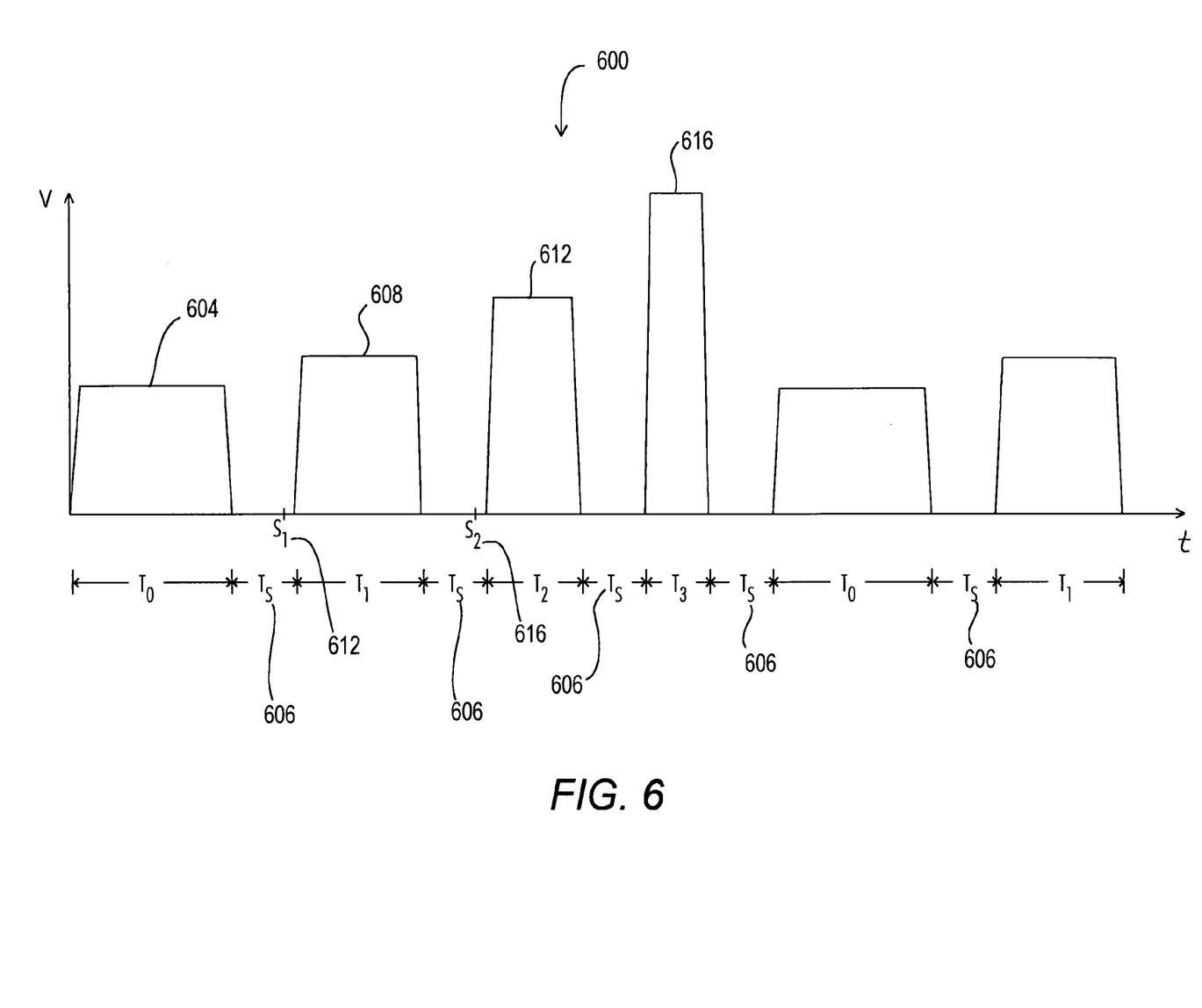
FIG. 6 is a diagrammatic representation of a pulse train produced according to an embodiment of the present invention.

With reference now to FIG. 6, a pulse train 600 in accordance with an embodiment of the present invention is illustrated. The example pulse train 600 illustrated in FIG. 6 may be generated using the values set forth in Table 1. Thus, when N is equal to 0, the pulse width $T_0$ is equal to 5 units. In addition, when N is equal to 0, the proportional term $Kp_N$, here $Kp_0$, is equal to 1/5. At N=1, $T_1$ equals 4 units and $Kp_1$ equals 1/4. Similarly, at N=2, $T_2$ equals 3 units and $Kp_2$ equals 1/3, and at N=3, $T_3$ equals 2 units and $Kp_3$ equals 1/2. It will be appreciated that the pulse width value $T_N$ multiplied by the proportional term $Kp_N$ is equal to 1 for any value of N. Accordingly, the power supplied to the voice coil motor 128 is normalized by the proportional term $Kp_N$, regardless of the pulse width $T_N$. Therefore, the pulse width or time $T_N$ does not itself affect the total amount of power supplied to the voice coil motor 128 during a discrete pulse.

As mentioned above, the pulse train 600 comprises pulses having pulse lengths determined by the values set forth in Table 1. Furthermore, the pulse train 600 consists of pulses that each contain an equal quantity of power. In particular, the first pulse 604 of the pulse train 600 remains on for a pulse width or time $T_0$, here equal to 5 units. The first pulse 604 is followed by a sampling period $T_S$ 606. The back EMF is sampled during the sampling period $T_S$ 606, preferably at a point $S_1$ 612 that is towards the end of the sampling period 606.

Referring to both FIG. 5 and FIG. 6, after the back EMF has been sampled (step 528), the velocity error of the transducer head 124 is calculated (step 532). Next, $T_N$ is determined (step 536). As N is now equal to 1, reference to Table 1 provides a value $T_1$ equal to 4 units and $Kp_1$ equal to 1/4. The output $I_1$ to the voice coil motor 128 is then calculated (step 540). The second pulse 608 calculated at interval N=1 can be seen to have a higher output voltage than the previous pulse 604. The second pulse 608 can also be seen to have a narrower width than the first pulse 604, as $T_1$=4 units. The total area of the second pulse 608 at interval N=1 is equal to the total area of the first pulse 604 at interval N=0. This is the expected output when the velocity error and any other inputs to the proportional-integral controller 408 remain unchanged. Of course, in operation, the amount of power in each pulse will typically vary due to the efforts of the controller 408 to maintain the transducer head 124 at the desired velocity.

As described above, if it is determined that the transducer head 124 has not yet been loaded (step 512), the system again waits for a sample time $T_S$ 606 (step 520), during which time no power signal 444 is supplied to the voice coil motor 128. Sample time $T_S$ 606 may be a predetermined amount of time. In general, time $T_S$ 606 is long enough to allow any voltage remaining in the coil 416 of the voice coil motor 128 due to the inductance of the coil 416 to dissipate before the back EMF 432 in the coil 416 is sampled. Accordingly, towards the end of the time $T_S$ 606, at point $S_2$ 616, the back EMF 432 is sampled (step 528).

In the example illustrated in FIG. 6, it is assumed that the proportional-integral controller 408 receives a velocity error signal 436 such that it directs each pulse in the pulse train 600 to provide the same total amount of power to the voice coil motor 128. Accordingly, the third pulse 612 has a pulse width $T_2$ of 3 units, but the total area of the third pulse 612 is equal to the areas of each of the preceding pulses 604 and 608. The fourth pulse 616 has a pulse width $T_3$ equal to 2 units, but a higher output than any of the preceding pulses 604, 608 and 612. In particular, the area of the pulse 616 is equal to the area of each of the pulses 604, 608 and 612.

In the illustrated example, which receives pulse widths $T_N$ from Table 1, N is determined by a two bit counter. Therefore, incrementing the counter from N=3 results in a value of N=0, and the pattern of pulses having widths of 5, 4, 3 and 2 units respectively is repeated. In this way, a pulse train is supplied to the voice coil motor 128 that produces an acoustical output that comprises at least four major frequencies, and the amplitude of that output is divided among the four frequencies. This is in contrast to a conventional pulse train used for controlling a voice coil motor 128 during loading and unloading operations, which produces an audible output concentrated at one frequency. Accordingly, the acoustical output produced by a pulse train 600 in accordance with the present invention has a volume that is lower at any particular frequency, and is less objectionable than a pulse train having a series of pulses that are identical in their duration.

Figure 7A:
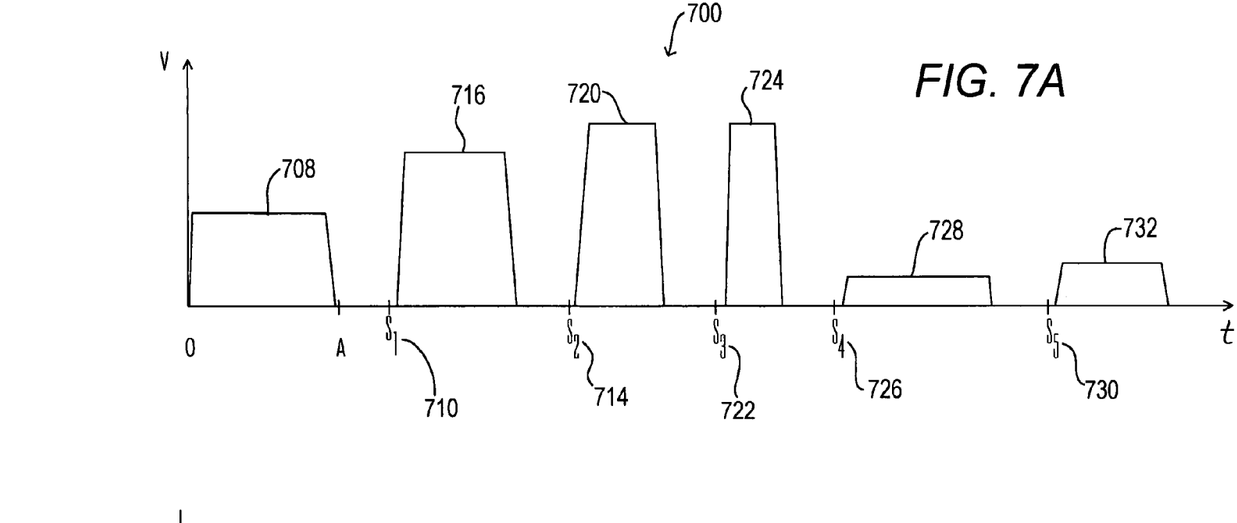
FIG. 7A is a diagrammatic representation of a pulse train produced according to an embodiment of the present invention providing a varied output to the voice coil motor.
Figure 7B:
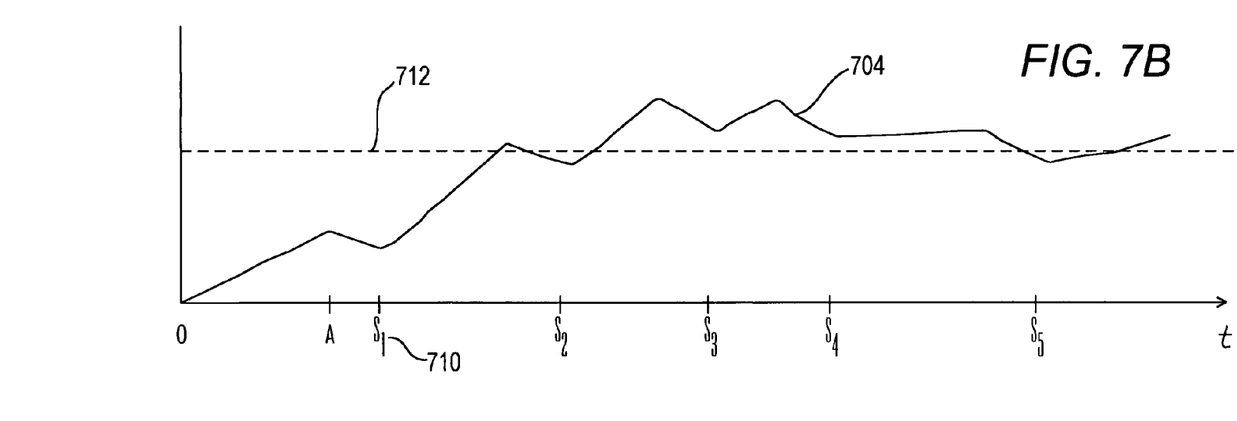
FIG. 7B illustrates an example velocity of a transducer head in response to power inputs to the voice coil motor as illustrated in FIG. 7A.

With reference now to FIGS. 7A and 7B, aspects of the operation of an embodiment of the present invention are illustrated. In particular, FIG. 7A illustrates a pulse train 700 provided as a power signal 444 to a voice coil motor 128. The trace 704 in FIG. 7B illustrates the velocity of the transducer head 124 with respect to the disk 108 in response the pulse train 700 shown in FIG. 7A.

In general, the pulses comprising the pulse train 700 have one of four possible widths. In particular, the pulse widths may be determined using a counter as an index to a table (e.g. Table 1) of pulse widths and corresponding proportioning values. Accordingly, the assignment of pulse widths and proportioning values to a particular pulse may be carried out as described above with respect to the pulse train 600 illustrated in FIG. 6. Initially, at time 0, a first pulse 708 having a duration or width of five units is supplied as a power signal 444 to the voice coil motor 128. In response to the first pulse 708, the velocity of the transducer head 124 can be seen to accelerate in FIG. 7B. At time A, after the pulse 708 has ended, the velocity of the transducer head 124 can be seen to decelerate slightly, for instance due to friction. At point $S_1$ 710, the back EMF in the voice coil motor 128 is sampled. Accordingly, at point $S_1$ 710, the controller 132 is provided with information concerning the velocity of the transducer head 124. Because at point $S_1$ 710 the velocity as shown by trace 704 is less than a target velocity 712, it is determined that more power should be supplied to the voice coil motor 128.

According to one embodiment of the present invention, the proportional-integral controller 408 determines the power signal 444 to be applied to the voice coil motor 128 according to an algorithm that includes both proportional and integral terms. In particular, according to one embodiment of the present invention, the power signal 444 is given by the equation $I=Kp_n*BEMFerror_n+Nulli_n$, where $Nulli_{n+1}=Nulli_n+Ki*Kp_n*BEMFerror_n$, and where $Kp_n$ is a proportional term, $K_i$ is an integral term, $Nulli_n$ is the integrator value, and $BEMFerror_n$ is the difference between the measured back EMF and the reference voltage corresponding to the desired transducer head 124 velocity. As described above, $Kp_n$ may be inversely proportional to the pulse length of $T_n$. According to one embodiment of the present invention, $K_i$ is a fractional value.

The second pulse 716 has a width of 4 units. However, the total area, and thus the total amount of power provided by the second pulse 716, is greater than the total area of the first pulse 708. In response to the second pulse 716, the trace 704 of the velocity of the transducer head 124 can be seen to increase. At point $S_2$ 718, a sample of the back EMF 422 in the voice coil motor 128 is again taken. The controller 132 receives this information and determines that the velocity of the transducer head 124 has moved closer to the target velocity 712, but is still below the target velocity 712. Accordingly, the third pulse 720, which has a time equal to 3 units, is provided having a total area slightly less than the total area of the preceding pulse 716. At point $S_3$ 722, a sample of the back EMF is again taken, and it is determined that the velocity of the transducer head 124 exceeds the target velocity 712. Accordingly, the fourth pulse 724, which has a width of 2 units, has an area less than the total area of the preceding pulse 720.

At point $S_4$ 726 it is determined that the velocity of the transducer head 124 remains above the target velocity 712. Accordingly, although the fifth pulse 728 has a width of 5 units, the total area of the fifth pulse 728 is much less than any of the preceding pulses, in order to bring the velocity of the transducer head 124 closer to the target velocity 712. In addition to the influence of the velocity detected at point $S_4$ 726, which is greater than the target velocity 712, the electrical power supplied by the fifth pulse 728 is reduced as compared to the previous pulses 708, 716, 720 and 724 due to the effects of the integral term of the proportional-integral controller 408, which accounts for accumulated velocity errors. At point $S_5$ 730 a sixth pulse 732 is provided having a width of 4 units and slightly more area than the fifth pulse 728, as the velocity of the transducer head 124 is about equal to the target velocity 712.

Of course, the particular amounts of power provided by individual pulses in a pulse train such as the pulse train 700 illustrated in FIG. 7A will vary depending on the particular algorithm implemented by the proportional-integral controller 408. However, it should be appreciated that, according to the embodiment of the present invention described in connection with FIGS. 7A and 7B, each pulse in a pulse train produced in accordance with that embodiment has a width that is different from the width of the preceding pulse. According to other embodiments, each pulse need not have a width that differs from the preceding pulse. For instance, a train of two or more pulses having a first width may be followed by a train of two or more pulses of a second width.

In the discussion set forth herein, the pulse widths have been described in terms of "units". It will be appreciated that the pulse times selected for a particular application may be determined for that application. In addition, it will be appreciated that the particular pulse widths selected are not important, so long as the width of a pulse at any point in time is different from the preceding pulse. According to one embodiment of the present invention, four different pulse widths ($T_1=400$ μs, $T_2=1000$ μs, $T_3=600$ μs and $T_4=800$ μs) are used. However, the number of different pulse widths and the values of the pulse widths may be adjusted to suit the particular application.

In the preceding examples and discussion, the loading of a transducer head 124 onto the surface of a disk 108 has been described. However, the present invention is equally applicable to the unloading of a transducer head 124 from a disk 108. In particular, the present invention reduces the acoustical output of a disk drive 100 during the unloading of a transducer head 124 by providing a train of pulses having varying widths. However, instead of detecting position signals derived from the surface of a disk 108 to indicate that a transducer head 124 has been loaded, during unloading, reaching a maximum current for several samples in a row, without reaching a target velocity, may be used to indicate that a transducer head has properly engaged a corresponding cam 140.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for controlling the velocity of a disk drive transducer head during a load or unload operation, comprising:
   introducing for a first period of time a first quantity of electrical power to a voice coil motor to move said transducer head, wherein said first period of time is not dependent on a velocity of said transducer head;
   determining said velocity of said transducer head; and
   introducing for a second period of time a second quantity of electrical power to said voice coil motor to move said transducer head, wherein said second period of time is not equal to said first period of time, and wherein said second period of time is not dependent on said velocity of said transducer.

2. The method of claim 1, wherein said step of determining a velocity of said transducer head comprises:
   removing said electrical power from said voice coil motor for a period of time; and
   measuring a BEMF voltage across said voice coil motor, wherein said BEMF voltage indicates a velocity of said transducer head.

3. The method of claim 2, wherein said step of measuring a voltage across said voice coil motor comprises comparing said measured voltage to a reference voltage corresponding to a desired velocity of said transducer head.

4. The method of claim 2, wherein said BEMF voltage is measured when said electrical power has been removed.

5. The method of claim 1, wherein said first and second quantities of electrical power are equal.

6. The method of claim 1, wherein said first and second quantities of electrical power are not equal.

7. The method of claim 1, wherein a first proportioning value equal to an inverse of said first period of time is applied to a calculation of an amount of power to obtain said first quantity of electrical power, and wherein a second proportioning value equal to an inverse of said second period of time is applied to a calculation of an amount of power to obtain said second quantity of electrical power.

8. The method of claim 1, wherein a voltage applied to said voice coil motor during said first period of time is not equal to a voltage applied to said voice coil motor during said second period of time.

9. The method of claim 1, further comprising:
   incrementing a counter for each period of time during which electrical power is introduced to said voice coil motor;
   providing a table of time values; and
   using a value of said counter as a table index, wherein a time value pointed to by said table index determines said first and second periods of time.

10. The method of claim 9, wherein for each of said time values said table includes a corresponding proportioning value, wherein a first of said proportioning values is applied to a calculation of said first quantity of electrical power, and wherein a second of said proportioning values is applied to a calculation of said second quantity of electrical power.

11. The method of claim 1, wherein said first and second quantities of electrical power are controlled by controlling at least one of a drive voltage and a drive current.

12. The method of claim 1, wherein at least one of said first and second periods of time are randomly determined.

13. The method of claim 1, wherein at least one of said first and second periods of time are pseudo-randomly determined.

14. The method of claim 1, wherein said first period of time is randomly determined, and wherein an algorithm used to calculate said first quantity of electrical power includes as a term a value that is inversely proportional to said randomly determined first period of time.

15. The method of claim 1, wherein said first period of time is pseudo-randomly determined, and wherein an algorithm used to calculate said first quantity of electrical power includes as a term a value that is inversely proportional to said pseudo-randomly determined first period of time.

16. The method of claim 1, wherein said second period of time is a multiple of said first period of time.

17. The method of claim 1, wherein said second quantity of electrical power is greater than said first quantity of electrical power if said determined velocity of said transducer head is less than a desired velocity.

18. The method of claim 1, wherein said second quantity of electrical power is less than said first quantity of electrical power if said determined velocity of said transducer head is greater than a desired velocity.

19. The method of claim 1, further comprising:
   determining a velocity of said transducer head after said step of introducing a second quantity of electrical power;
   introducing for a third period of time a third quantity of electrical power to said voice coil motor to move said transducer head;
   determining a velocity of said transducer head after said step of introducing a third quantity of electrical power;
   introducing for a fourth period of time a fourth quantity of electrical power to said voice coil motor to move said transducer head, wherein said first, second, third and fourth periods of time are not equal.

20. The method of claim 19, wherein said first, second, third and fourth quantities of electrical power are equal.

21. The method of claim 19, wherein the first period of time is a first pulse width, the second period of time is a second pulse width, the third period of time is a third pulse width and the fourth period of time is a fourth pulse width.

22. The method of claim 1, wherein said steps are repeated until said disk drive transducer head has been loaded onto a surface of said disk drive.

23. The method of claim 1, wherein said steps are repeated until said disk drive transducer head has been unloaded from a surface of said disk drive.

24. The method of claim 1, wherein said first and second quantities of electrical power are determined by a controller, and wherein said quantities of electrical power are dependent upon a velocity of said transducer head.

25. The method of claim 1, wherein said first and second quantities of electrical power are dependent on at least a velocity of said transducer head and an accumulated velocity error.

26. The method of claim 1, wherein said first and second quantities of electrical power are determined by a controller implementing a control algorithm.

27. The method of claim 26, wherein said control algorithm comprises a control algorithm having an integral term.

28. The method of claim 27, wherein a fixed fraction of a previous quantity of electrical power introduced to said voice coil motor is added to said integral term of said control algorithm.

29. The method of claim 26, wherein said controller provides an output signal I to said voice coil motor, wherein $I=Kp_n*BEMFerror_n+Nulli_n$, and wherein $Nulli_{n+1}=Nulli_n+Ki*Kp_n*BEMFerror_n$.

30. The method of claim 1, wherein the first period of time is a first pulse width and the second period of time is a second pulse width.

31. The method of claim 1, wherein the first amount of electrical power moves said actuator arm and wherein the second amount of electrical power moves said actuator arm.

32. A method for loading or unloading a hard disk drive transducer head, comprising:
providing a first amount of electrical power to a voice coil motor for a first period of time to move said transducer head with respect to a surface of a storage disk;
measuring a velocity of said transducer head;
comparing said measured velocity to a desired velocity; and
providing a second amount of electrical power to a voice coil motor for a second period of time to move said transducer head with respect to said surface of said storage disk, wherein said second amount of power is proportionate to a difference between said measured velocity of said transducer head and said desired velocity, and wherein said first period of time does not equal said second period of time,
wherein said steps of providing, measuring, comparing and providing are performed during a load or unload operation.

33. The method of claim 32, wherein said step of determining a velocity of said transducer head comprises:
removing said electrical power from said voice coil motor for a period of time; and
measuring a back EMF voltage across said voice coil motor, wherein said back EMF voltage indicates a velocity of said transducer head.

34. The method of claim 33, wherein said BEMF voltage is measured when said electrical power has been removed.

35. The method of claim 32, wherein said desired velocity is a target velocity.

36. The method of claim 32, further comprising providing an Nth amount of power to said voice coil motor for an Nth period of time to move said transducer head with regard to said surface of said storage disk.

37. The method of claim 36, wherein said Nth amount of power is a function of:
1) a difference between said measured velocity of said transducer head and said desired velocity; and
2) an accumulated difference between said measured velocity and said desired velocity.

38. The method of claim 32, wherein said steps of providing a first amount of electrical power, measuring, comparing and providing a second amount of electrical power are repeated until said transducer head has attained a desired position with respect to said storage disk.

39. The method of claim 32, wherein said first and second periods of time are not equal to zero.

40. The method of claim 32, wherein the first period of time is a first pulse width and the second period of time is a second pulse width.

41. The method of claim 32, wherein said first period of time and the second period of time are not dependent on the velocity of the transducer head.

42. The method of claim 32, wherein the first amount of electrical power moves said actuator arm and wherein the second amount of electrical power moves said actuator arm.

43. A disk drive apparatus, comprising:
a base;
a magnetic storage disk rotatably mounted to said base;
an actuator arm pivotally mounted to said base;
a cam;
a transducer head mounted to a first end of said actuator arm, wherein said transducer head is capable of reading information from and writing information to said magnetic storage disk;
a voice coil motor for moving said first end of said actuator arm radially across said magnetic storage disk from a first position in which said actuator arm is engaged with said cam to a second position in which said actuator arm is positioned such that said transducer head is capable of addressing information stored on a surface of said magnetic disk;
a controller for producing an output signal for actuating said voice coil motor to move said transducer head from said first position to said second position, wherein said voice coil motor is provided a first amount of electrical power over a first period of time to move said actuator arm during a load or unload operation, wherein following said first period of time plus an additional period of time a back electromotive force of said voice coil motor is sampled to determine a velocity of said transducer head during the load or unload operation, wherein said voice coil motor is provided with a second amount of electrical power over a second period of time to move said actuator arm during the load or unload operation, and wherein said first period of time is not equal to said second period of time.

44. The disk drive apparatus of claim 43, wherein said first and second amounts of electrical power are equal.

45. The disk drive apparatus of claim 43, further comprising a counter, wherein said counter points to a table of values, wherein said values determine said first and second periods of time.

46. The disk drive apparatus of claim 45, wherein said table comprises more than two values.

47. The disk drive apparatus of claim 45, wherein a multiplier is associated with each value within said table of values, wherein said multiplier modifies said output signal.

48. The disk drive apparatus of claim 43, wherein said controller comprises a proportional-integral controller.

49. The disk drive apparatus of claim 43, wherein said voice coil motor is provided with a third amount of electrical power over a third period of time to move said actuator arm, wherein said third period of time is not equal to said first and second periods of time.

50. The disk drive apparatus of claim 49, wherein the first period of time is a first pulse width, the second period of time is a second pulse width and the third period of time is a third pulse width.

51. The disk drive apparatus of claim 43, wherein said first period of time and the second period of time are not dependent on the velocity of the transducer head.

52. The disk drive apparatus of claim 43, wherein the first period of time is a first pulse width and the second period of time is a second pulse width.

53. The disk drive apparatus of claim 43, wherein the first amount of electrical power moves said actuator arm and wherein the second amount of electrical power moves said actuator arm.

54. A method for controlling the velocity of a disk drive transducer head, comprising:

introducing for a first period of time a first quantity of electrical power to a voice coil motor to move said transducer head, wherein said first period of time is not dependent on a velocity of said transducer head;

determining said velocity of said transducer head; and introducing for a second period of time a second quantity of electrical power to said voice coil motor to move said transducer head, wherein said second period of time is not equal to said first period of time, and wherein said second period of time is not dependent on said velocity of said transducer,     wherein said first and second quantities of electrical power are determined by a controller implementing a control algorithm, wherein said controller provides an output signal I to said voice coil motor, wherein $I=Kp_n*BEMFerror_n+Nulli_n$, and wherein $Nulli_{n+1}=Nulli_n+Ki*Kp_n*BEMFerror_n$.

55. The method of claim 54, wherein the first period of time is a first pulse width and the second period of time is a second pulse width.

56. The method of claim 54, wherein the first amount of electrical power moves said actuator arm and wherein the second amount of electrical power moves said actuator arm.

* * * * *